US012461983B1

United States Patent
Fassett et al.

(10) Patent No.: US 12,461,983 B1
(45) Date of Patent: Nov. 4, 2025

(54) SYSTEM FOR RESOLVING DOMAIN NAMES ON THE INTERNET

(71) Applicant: Medistry, LLC, Cleveland, OH (US)

(72) Inventors: Ray Fassett, Avon, OH (US); Tom Cooper, North Ridgeville, OH (US); Dan Kraciun, Avon, OH (US); Lloyd Mager, Marshall, TX (US)

(73) Assignee: Medistry, LLC, Cleveland, OH (US)

( * ) Notice: Subject to any disclaimer, the term of this patent is extended or adjusted under 35 U.S.C. 154(b) by 9 days.

(21) Appl. No.: 18/472,363

(22) Filed: Sep. 22, 2023

Related U.S. Application Data (60) Provisional application No. 63/376,684, filed on Sep. 22, 2022.

(51) Int. Cl.
*G06F 16/955* (2019.01)
(52) U.S. Cl.
CPC .................................. *G06F 16/9566* (2019.01)
(58) Field of Classification Search
None
See application file for complete search history.

(56) References Cited

U.S. PATENT DOCUMENTS

| | | | |
|---|---|---|---|
| 7,251,826 B1* | 7/2007 | Gardos | G06F 16/953 |
| 8,533,075 B1* | 9/2013 | Sayers, III | G06F 16/903 |
| 2002/0161745 A1* | 10/2002 | Call | G06F 16/9554 |
| 2012/0055984 A1* | 3/2012 | Van Megchelen | G06F 16/9554 |
| 2016/0344740 A1* | 11/2016 | Choi | G06F 16/90 |
| 2020/0226617 A1* | 7/2020 | Meadow | G06F 16/9554 |

OTHER PUBLICATIONS

Tld-list, "https://web.archive.org/web/20161228232725/https://tld-list.com/tld/med", all pages. (Year: 2016).*

* cited by examiner

*Primary Examiner* — Son T Hoang
(74) *Attorney, Agent, or Firm* — Benesch Friedlander Coplan & Aronoff LLP (57) ABSTRACT

To address the challenges with managing a pharmaceutical drug supply chain, a system for GTIN resolving domain names in the format GTIN.gTLD, or similar, is described herein, including the functionality of a single registrant gTLD registry database adapted to contain one or more second-level domains including the GTIN, and a DNS adapted to resolve one or more nameservers retrieved from the registry database.

2 Claims, 7 Drawing Sheets

SYSTEM FOR RESOLVING DOMAIN NAMES ON THE INTERNET

CROSS-REFERENCE TO RELATED APPLICATIONS

This application claims priority to U.S. Provisional Patent Application No. 63/376,684 titled "System for Managing a Drug Supply Chain on Internet" and filed on Sep. 22, 2022, the disclosure of this patent application being incorporated herein by reference in their entirety.

FIELD OF INVENTION

The present disclosure generally relates to a system and method for managing a pharmaceutical supply chain on the internet. More specifically, the present disclosure relates to managing a drug supply chain by resolving a GTIN on the internet, wherein the GTIN is associated with a drug in the supply chain. It finds particular applicability with a single registrant gTLD adapted to provide a URL in the form of GTIN.gTLD.

BACKGROUND

One generic Top Level Domain (gTLD) contained in the IANA root database includes the extension .med. Most gTLDs contained in the IANA root database require a Registry Operator contracted with the Internet Corporation for Assigned Names and Numbers (ICANN). For example, the entity Medistry LLC is the Registry Operator of the .med gTLD. The general purpose of each Registry Operator is to enable, through various methods of allocation, the creation and management of domain names which resolve on the Internet, such as to an IP address.

The party a domain name is allocated to is considered the Registrant of Record of the domain name. In the domain name example amazon.jobs, jobs is the gTLD whose Registry Operator recognizes the company Amazon as the Registrant of Record of the second-level domain name. In this example, "amazon" is considered the second-level domain and .jobs the gTLD. Together this forms the Fully Qualified Domain Name of: amazon.jobs.

A Registry Operator of a gTLD may allocate domain names to parties outside of its organization (each becoming a Registrant of Record for a particular second level domain) or maintain this status itself for every domain name created in its gTLD. In the latter case, the Registry Operator is considered a single registrant gTLD. Operation of a registry as a single registrant gTLD requires written permission from ICANN, along with other obligations.

Drug manufacturers have widely adopted the practice of assigning a Global Trade Item Number, or GTIN, to uniquely identify a drug product. A drug product GTIN is normally 8-14 characters in length. It is a widely adopted industry practice for a drug product manufacturer to place the GTIN inside a 2D Data Matrix contained on the label of the drug product. Through existing methods of scanning, the GTIN can be extracted from inside the 2D data matrix. Generally, the purpose is to update internal software systems, such as for inventory management.

SUMMARY

To address the challenges with managing a pharmaceutical drug supply chain, a system for GTIN resolving domain names in the format GTIN.gTLD, or similar, is described herein, including the functionality of a single registrant gTLD registry database adapted to contain one or more second-level domains including the GTIN, and a DNS adapted to resolve one or more nameservers retrieved from the registry database.

BRIEF DESCRIPTION OF THE DRAWINGS

In the accompanying drawings, elements are illustrated that, together with the detailed description provided below, describe example embodiments of the disclosed systems and methods. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of systems and methods of managing a drug supply chain on the internet are hereinafter disclosed and described in detail with reference made to FIGS. 1 through 11.

Figure 1:
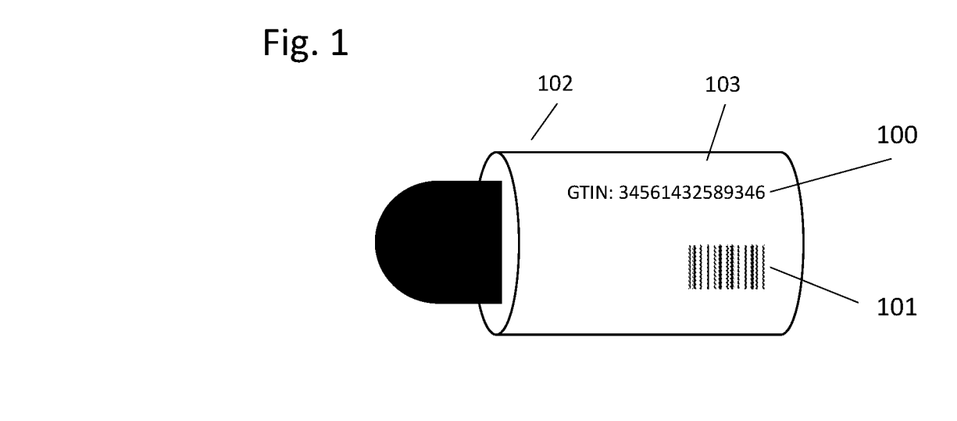
FIG. 1 illustrates an exemplary GTIN and a 2d computer-readable code containing a GTIN.
Figure 2:
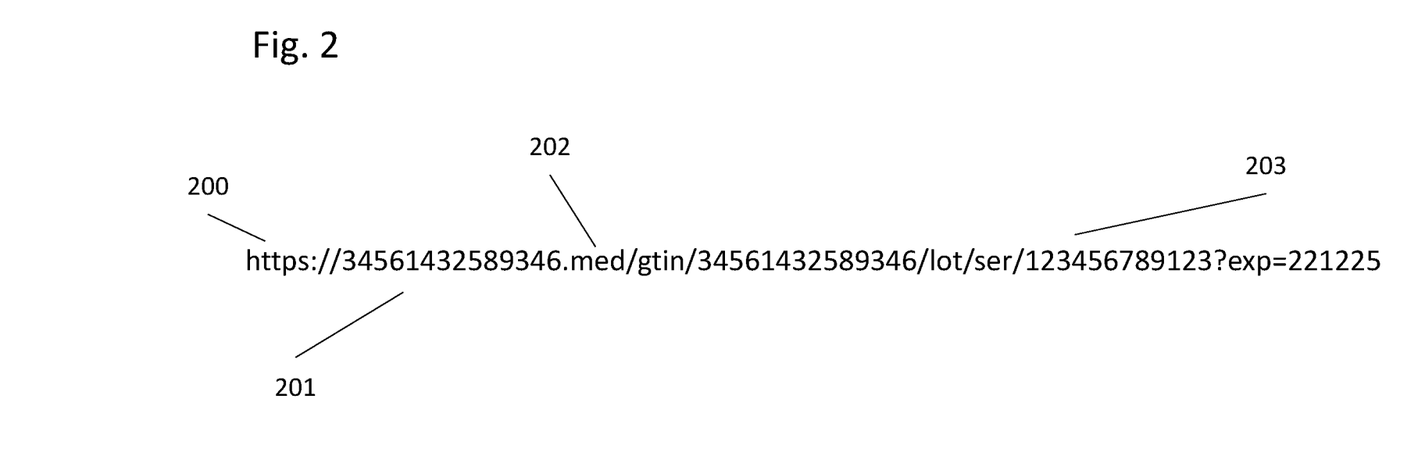
FIG. 2 illustrates an exemplary URL including a GTIN and a gTLD.

In one embodiment, the invention includes a gTLD registry database including at least one second level domain registration which is comprised of at least one GTIN. For example, FIG. 1 illustrates the GTIN 00300780383349 displayed on a drug label 103 on a drug product 102 in both human readable form 100 and inside a bar code 101. While a bar code is shown, it will be appreciated that any computer-readable optical scanning visualization may be used, including, for example, a QR Code or any computer-readable 2D data matrix. With reference to FIG. 2, a URL 200 is provided which is comprised with the GTIN 201 and TLD 202, along with optional parameters 203.

In this example, TLD 202 is any gTLD or ccTLD capable of resolving on the internet. In an embodiment, TLD 202 is a TLD under license from ICANN to a Registry Operator and wherein such Registry Operator has implemented one or more rules which restrict registrants in the TLD to a limited number of entities or individuals. Such rules may restrict registration to a pre-defined group of entities, such as drug manufacturers (prescription or otherwise), contract drug manufacturers, virtual drug manufacturers, repackagers, distributors, dispensers and or suppliers. In another embodiment, TLD 202 is a TLD under license from ICANN to a Registry Operator in which the TLD is a single registrant gTLD. In this embodiment, such Registry Operator is contractually obligated to ICANN to restrict the pool of registrants for second level domains in the TLD. Such restrictions may include limiting registrants to a single registrant, such as for example the Registry Operator itself or a designee. While an embodiment is described herein wherein TLD 202 is a single registrant gTLD in which the Registry Operator of the gTLD is the sole registrant of all second level domains in the gTLD, it will be appreciated that the restrictions on second level registrants in such a gTLD are subject to rules and regulations as promulgated by ICANN and as memorialized in written registry agreements between ICANN and a registry operator, and that such restrictions may be defined in a manner in which a single registrant may include additional entities or individuals who are contracted to, under the control of, or otherwise related/associated/affiliated with the identified "single" registrant entity.

In an example, TLD 202 is the gTLD ".med". In a further example, the gTLD "med" is operated by a registry operator as a single registrant gTLD.

With reference again to FIG. 2, URL 200 further comprises GTIN 201. In this example, GTIN 201 is a second level domain in TLD 202 and may represent the drug product referenced by the GTIN (e.g. 00300780383349.med or simply referenced categorically as "GTIN.med"). GTIN 201 may take any form recognized in the GS1 industry. In an example and with further reference to FIG. 1, a GTIN may be associated with a particular prescription drug, non-prescription drug, a batch of such drug, serial number, or a certain quantity or delivery of such drug.

In an embodiment, a gTLD Registry operating as single registrant for the purpose of creating and managing GTIN's as second-level domain names is provided. In a system of this embodiment, a user may scan a drug product's 2D matrix, extract the GTIN as a second-level domain, for the purpose of resolving the GTIN as a URL to the Internet. Further, a user may enter a drug product's GTIN as a second-level domain into a browser address bar to resolve as a URL to the Internet.

Figure 3:
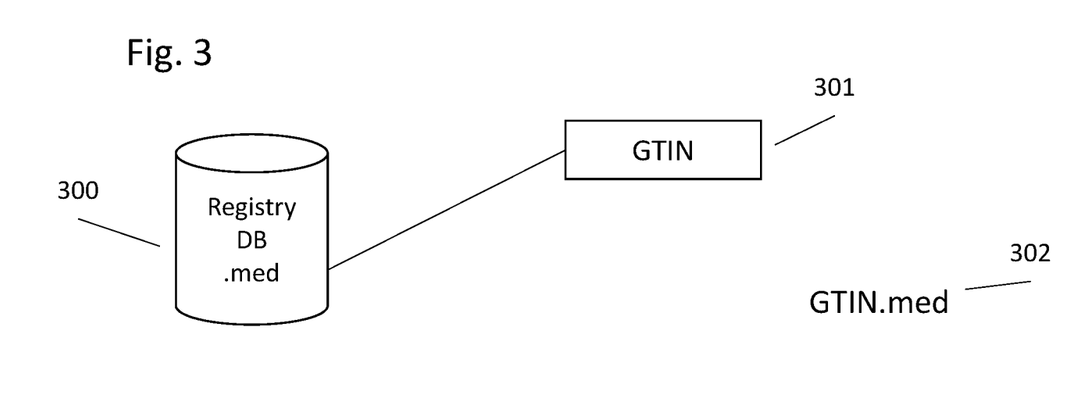
FIG. 3 illustrates an exemplary system including a registry database with a record containing a GTIN.

In an example, with reference to FIG. 3, a registry system for resolving GTINs is provided, comprising a registry database 300, at least one record entry 301 and (optionally) exemplary URL 302. Registry database 300 is any on-line database capable of resolving URL requests and generally includes a database associating second-level domains in a gTLD with resolving data, such as, for example, one or more IP addresses. Registry database 300 may be ICANN-complaint and may be operated by Registry Operator under license from ICANN. In an embodiment, registry database 300 is a gTLD registry database for a single registrant gTLD which contains resolving data for each second-level domain entry contained therein. In an example, the gTLD is .med.

Registry database 300 contains one or more record entries 301. Record entry 301 comprises at least one second-level domain in the gTLD operated for registry database 300. In an embodiment, each record entry 301 comprises a single second-level domain in the gTLD. For example, record entry 301 may be a GTIN, or may contain a GTIN string along with one or more additional characters.

Record entry 301 may further include suitable resolution information associated with a second level domain in registry database 300. In an example, record entry 301 comprises one or more IP addresses used to resolve a resource on the internet, so that an individual second-level domain in the gTLD has an associated IP address which can be used to resolve the second-level domain to a resource on the internet. In an additional example, record entry 301 includes one or more txt records associated with an individual second-level domain name.

Record entry 301 may be combined with the gTLD in a manner as illustrated by URL 302. For example, a URL for a particular GTIN is provided which comprises GTIN.gTLD. In examples wherein the gTLD is .med, such an exemplary URL is GTIN.med.

Figure 4:
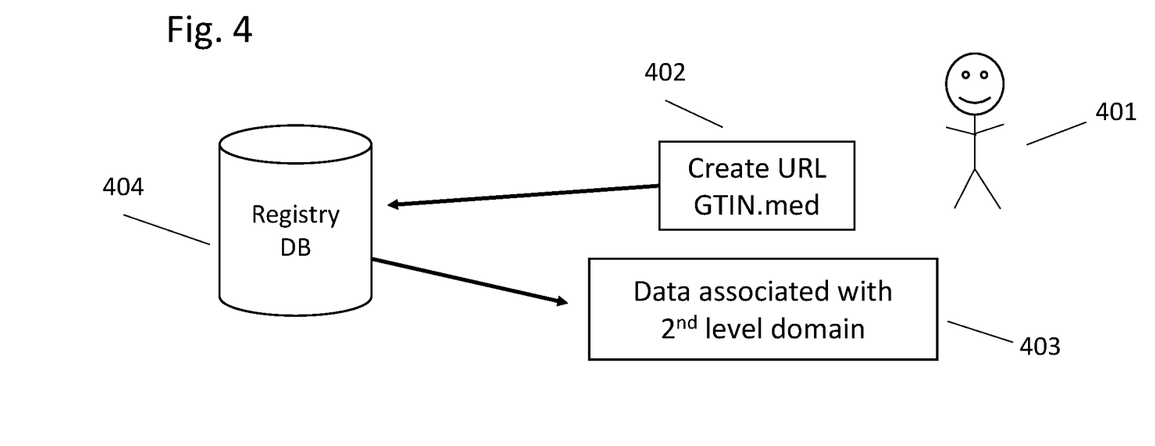
FIG. 4 illustrates an exemplary system including a user, a registry database and data associated with a second-level domain.

With reference to FIG. 4, a system for resolving GTIN records is provided, comprising one or more of a user 401, URL creator 402, registry database 404 and resulting data 403. User 401 is any user who desires to resolve a GTIN to a resource on the internet. Such a user may be a person who is typing a URL into a web browser or similar internet-accessing device/functionality, a scanning device which scans a computer-readable code (such as a QR code, 2D Matrix or bar code) which contains a GTIN or similar information, or any person or machine which is capable of providing a GTIN to such system.

URL creator 402 creates a URL comprising at least an inputted GTIN and a gTLD. For example, user 401 inputs a GTIN to URL creator 402, and URL creator 402 is adapted to append or concatenate a gTLD to the inputted GTIN, creating a URL in the form of GTIN.gTLD. In an example where the gTLD is .med, URL creator accepts an inputted GTIN and creates a URL of GTIN.med.

It will be appreciated that URL creator 402 may be any software or sequence of commands which is capable of receiving a GTIN and appending a gTLD on the end of the GTIN. URL creator 402 may be embedded in a scanner, a web browser, an app or computer program accessed by users wishing to input a GTIN and resolve that GTIN on the internet. For example, a warehouse manager at a pharmaceutical distributor may have a series of software applications available to maintain inventory, one application of which includes a URL creator 402 which allows the manager to manually type a GTIN code into the application, and the URL creator 402 within the application will create a URL of the form GTIN.gTLD. Similarly, an optical scanner may have URL creator 402 functionality embedded therein so that a QR code containing a GTIN may be optically scanned, and URL creator 402 functionality embedded in the scanner appends a gTLD to the scanned GTIN to create a URL which comprises GTIN.gTLD.

The gTLD contained in the URL created by creator 402 is then resolved (via any appropriate resolving functionality, such as a web browser) to registry database 404 associated with the gTLD. Registry database 404 may comprise the same functionality as registry database 300 of FIG. 3. Registry database 404 is accessed to return the IP resolution information associated with the requested URL. For example, the URL created by URL creator 402 resolves to a gTLD registry database, which contains an entry for the second-level domain contained in the passed URL, which then retrieves the IP address associated with such second-level domain, and passes such resolution information back to user 401.

Figure 5:
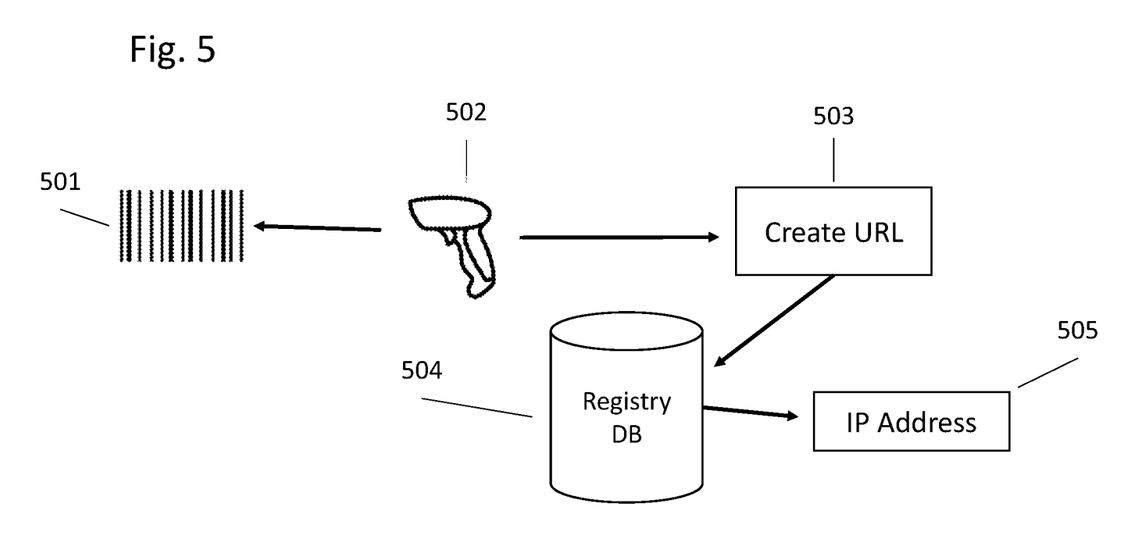
FIG. 5 illustrates an exemplary system including an optical scanner and a registry database.

With reference to FIG. 5, a system for scanning and resolving a GTIN is provided, including one or more of scanning device 502, URL creator 503 and registry database 504. In an embodiment, a scanning device 502 is used to scan a code 501. Scanning device 502 is any suitable scanner, such as a bar code reader or QR code compatible imaging device (such as, for example, a dedicated QR scanner or QR scanning functionality on a smart phone). Code 501 is any scannable code, particularly which contains at least a GTIN. For example, code 501 is a 2D data matrix code containing a single GTIN and scanning device 502 is a QR code scanner.

Upon scanning a GTIN, URL creator 503 (as described as URL creator 402) appends a gTLD to the scanned GTIN, creating a URL in the form of GTIN.gTLD. In an example of the gTLD .med, URL creator 503 creates a URL of GTIN.med. URL creator 503 may be software functionality incorporated with scanning device 502 or may be functionality accessed by scanning device 502 or scanning device 502's user in the course of creating a GTIN URL, or any other suitable functionality for appending a gTLD to a GTIN.

The gTLD contained in the URL created by creator 503 is then resolved (via any appropriate resolving functionality, such as a web browser) to registry database 504 associated with the gTLD. Registry database 504 may comprise the same functionality as registry database 404 of FIG. 4 or 300 of FIG. 3. Registry database 504 is accessed to return the IP resolution information associated with the URL used to resolve to registry database 504. For example, the URL created by URL creator 503 resolves to a gTLD registry database, which contains an entry for the second-level domain contained in the passed URL, which then retrieves the IP address resolution information associated with such second-level domain and passes such resolution information back to scanning device 502 or otherwise the user which requested the resolution.

Figure 6:
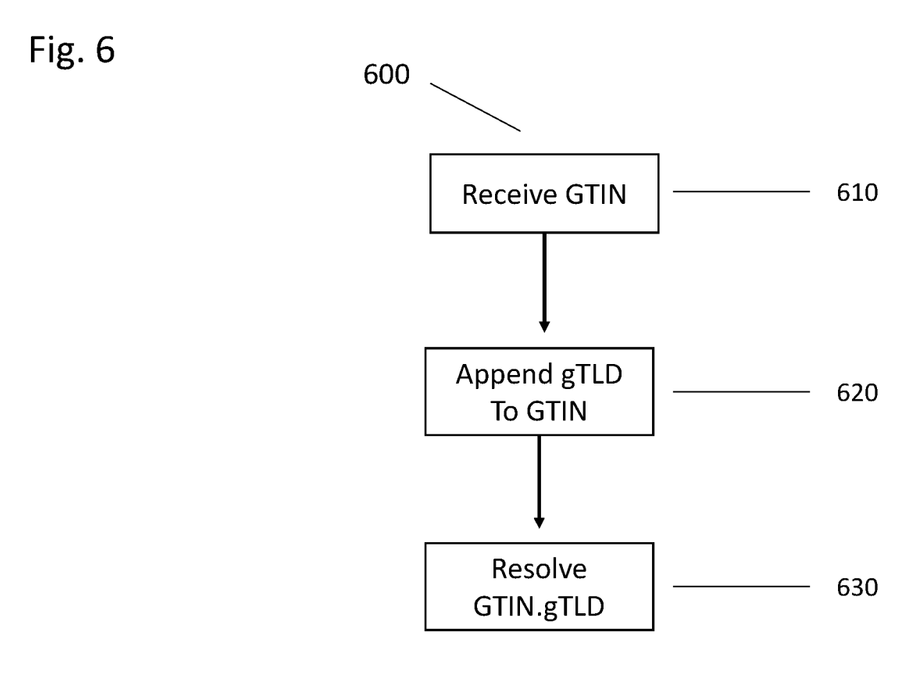
FIG. 6 is a flowchart illustrating an exemplary method for adapting a second-level domain in the form of GTIN.gTLD.

In an additional embodiment, with reference to FIG. 6, a method 600 for resolving a GTIN on the internet is provided. At 610 a GTIN is received. The GTIN may be received by any suitable manner, including but not limited to by being optically scanned by a QR code reader (or similar optical scanner) or inputted by a person (such as by typing a GTIN into a software application). At 620 a gTLD is appended to the GTIN to create a URL in the format of GTIN.gTLD. Such appending may be accomplished by any suitable functionality, including but not limited to computer applications which are capable of concatenating one or more strings together to create a URL which is comprised of the received GTIN plus a gTLD. In an embodiment, the gTLD is pre-determined so that the URL is the GTIN plus the pre-determined gTLD. For example with the gTLD med, at 620 a URL is created by appending ".med" to the received GTIN to create the URL GTIN.med. At 630 the URL is resolved on the internet. In embodiments wherein the URL is GTIN.gTLD, the resolution will occur at the registry database associated with the gTLD. For example in the gTLD .med, at 630 the registry database for .med will be accessed to resolve the URL GTIN.med by returning the resolution information (e.g., IP address) in the registry database associated with the particular GTIN which comprises the second level domain of the URL.

In an embodiment, the Registry Operator assigns applicable DNS records (such as nameservers) so that a GTIN.med domain name resolves as a URL to the World Wide Web. For increased functionality, such GTIN.med URL's may resolve to endpoints a user of the system expects, such as when a Registry Operator acts as the single registrant of all GTIN.med domain names.

Figure 7:
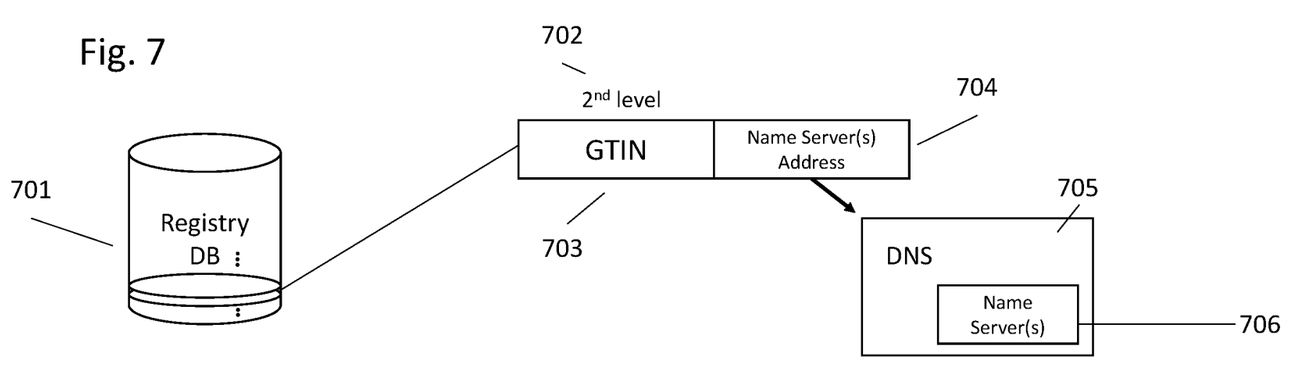
FIG. 7 illustrates an exemplary system including a registry database and DNS nameservers.

With reference to FIG. 7, a system of resolving GTIN.gTLD domain names is provided, comprising a registry database 701 containing one or more second-level domain entries 702, each comprising a GTIN value 703 corresponding to one or more nameservers 704, and communicating with a DNS 705 including one or more nameservers 706. A user desiring to gain information regarding a GTIN attempts to resolve a domain GTIN.gTLD; in so resolving, registry database 701 is accessed and retrieves one or more nameservers addresses associated with the GTIN.gTLD domain. User's resolver proceeds to resolve the DNS associated with the GTIN.gTLD domain. It will be appreciated that such resolution may include resolving to one or more namerservers.

DNS nameserver resolution is a core functionality of the internet. In these embodiments, a system for resolving information regarding GTINs is provided which uses common DNS nameserver functionality. Registry database 701 may be any appropriate TLD. In an example, registry database 701 is the registry database for the .med gTLD. Nameserver addresses 704 may be any suitable nameservers, pointing to any suitable devices at such addresses. DNS 705 may be any suitable DNS resolver and may include any suitable ability to resolve nameservers 706. A user is thus capable of obtaining information regarding a pharmaceutical drug identified by a GTIN by merely obtaining the GTIN (whether by typing into a browser, scanning, or otherwise), appending an appropriate gTLD (for example, .med), and then using the common infrastructure of the internet to return relevant information.

In another embodiment of a system providing a GTIN.gTLD resolver, further resolver functionality, such as a GS1 conformant resolver, may interpret the URL request for proper redirection to the endpoint for response (request/response). Example requests include: Is the drug product legitimate? Has the product been recalled? Who is the manufacturer of the drug product? Is the product expired? With reference to FIG. 2, an exemplary URL using parameters compliant with a GS1 conformant resolver is illustrated, with the .Med Resolver performing redirection to the applicable endpoint upon interpretating the GTIN.med URL request.

Figure 8:
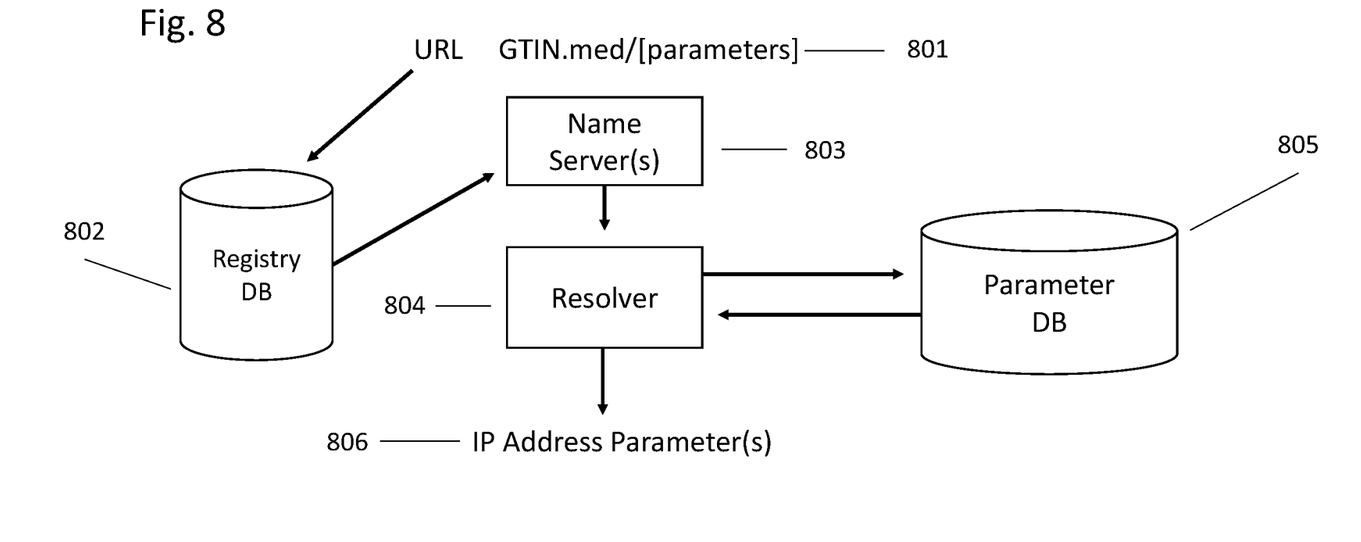
FIG. 8 illustrates an exemplary system including a registry database, a nameserver, a resolver and a parameter database.

With reference to FIG. 8, a GTIN information providing system is provided, comprising a registry database 802, one or more nameserver 803 and one or more resolver 804. Registry database 802 is any suitable registry database as described herein. Nameserver 803 is any suitable nameserver operating on the internet according to applicable standards. Resolver 804 is any suitable resolver operating in compliance with applicable internet standards. For example, resolver 804 may be a GS1 conformant resolver.

With reference to FIGS. 2 and 8, a URL 801 is provided. URL 801 may be any appropriate URL and may include a GTIN as a second-level domain and an appropriate gTLD, for example .med. URL 801 may also contain one or more parameters. Such parameters may be any information which indicates information desired by a user who provides a GTIN as part of the URL. Such parameters are adapted to return information regarding the product associated with the GTIN and may follow any suitable format or standard for returning information based upon an informational query. For example, the parameters may be compliant with the GS1 standard, including standards relating to a GS1 conformant resolver. Parameters may be stored in parameter database 805, which may contain associations between parameters and desired functionality, along with resolving functionality to return information based upon inputted parameters. URL 801 may be provided in any suitable way, such as by inputting into a web browser or scanning an optical code.

URL 801 is resolved using registry database 802 to resolve to nameservers 803, which may then resolve to resolver 804. Resolver 804 may access parameter database to further resolve the parameters contained in the URL. Resolver 804 provides a resulting IP address optionally along with parameters, allowing dynamic functionality at the resolving address.

In an example employing a GS1 compliant resolver 804, URL 801 contains one or more GS1 compliant parameters and URL 801 is resolved by registry database 802 providing nameservers 803 which point to GS1 compliant resolver.

Figure 9:
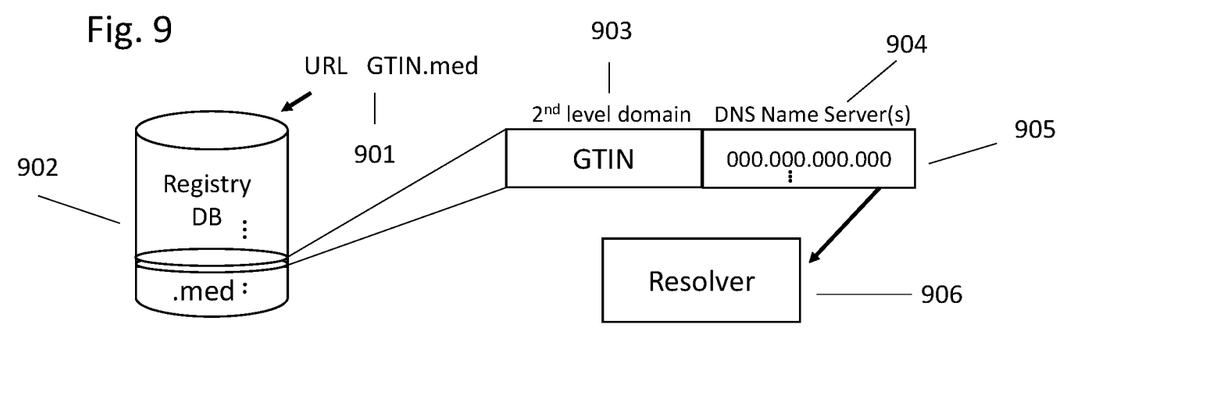
FIG. 9 illustrates an exemplary registry database and a resolver.

With reference to FIG. 9, a GTIN resolving system is provided, comprising a registry database 902 and a resolver 906. Registry database 902 is adapted to include GTIN values as second level domains. In an embodiment, all second level domains in registry database 902 are GTIN values. In another embodiment, registry database 902 is for the .med gTLD.

Each second-level domain record 903 in registry database 902 includes an association between a second-level domain therein and one or more DNS addresses 904. Such association may include, or be limited to, one or more nameservers 905. DNS 904 and, optionally or, nameservers 905 may point to resolver 906. Resolver 906 is any suitable IP address resolver.

Figure 10:
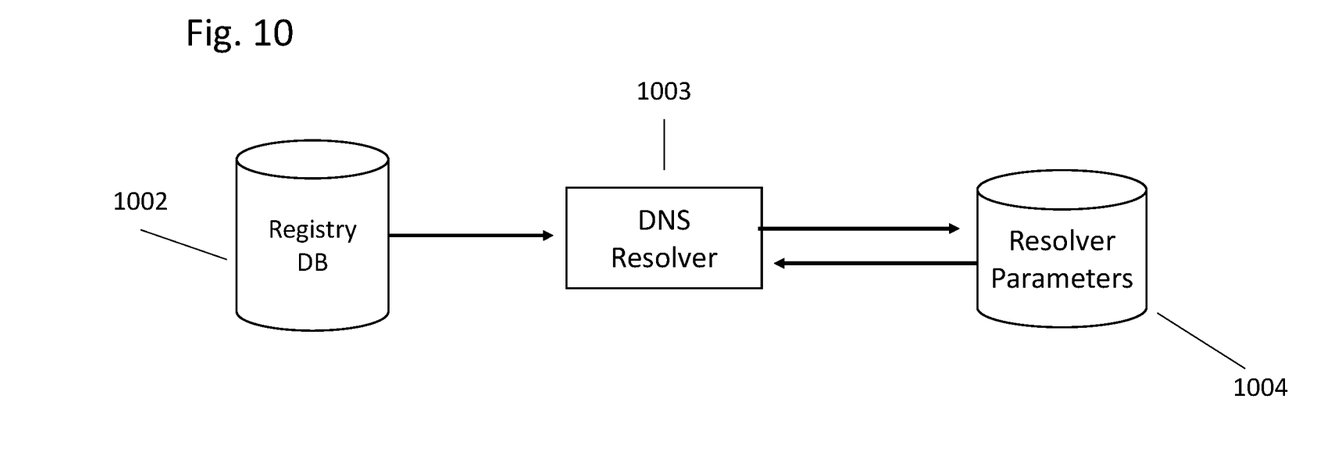
FIG. 10 illustrates an exemplary system including a registry database, DNS resolver and parameter database.

With reference to FIG. 10, a GTIN resolving system is provided, comprising a registry database 1002, one or more DNS resolvers 1003 and one or more resolver parameter databases 1004 which interact with resolver 1003 to resolve GTIN URLs. Registry database 1002 may be a single registrant gTLD, and in an example is for the .med gTLD. Resolver 1003 may be a GS1 conforming resolver, and parameter database 1004 may include GS1 conforming parameters and functionality.

Figure 11:
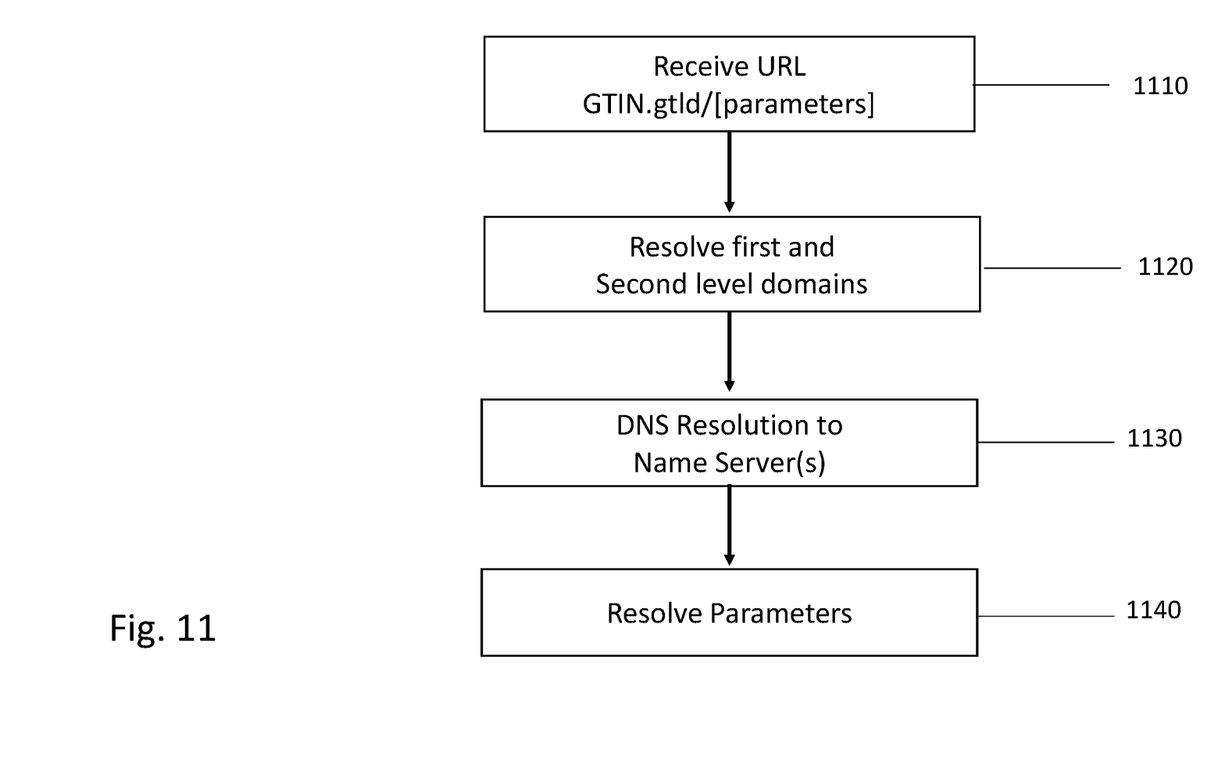
FIG. 11 is a flowchart illustrating an exemplary method for resolving a URL including a GTIN, a gTLD and one or more parameters.

With reference to FIG. 11, a method for resolving GS1 compliant URLs using a single registrant gTLD is provided. At step 1110, a URL is received. The URL includes a GTIN value as a second-level domain and a single registrant gTLD, such as for example .med, as a top level domain. The URL may include one or more GS1 compliant parameters.

At step 1120 the first and second level domains of the URL are resolved. Such resolution may occur using a registry database maintained for the single registrant gTLD by returning one or more nameservers (or optionally any appropriate IP address) associated with the second level domain in the registry database.

At step 1130 the nameservers returned in step 1120 are resolved. For example, such resolution may point to one or more resolver.

At step 1140 any parameters contained in the URL are resolved. Such resolution may be accomplished by any appropriate resolver; for example, a GS1 compliant resolver.

While the above embodiments have been set forth with regard to GTINs, it should be appreciated that such embodiments may also apply to any other unique identifiers used by participating entities of the drug supply chain such as a Global Location Number or GLN or National Drug Code or NDC.

While the above embodiments have been set forth with regard to gTLD's in the domain system in which ICANN governs multiple top level domains, it should be appreciated that such embodiments may also apply to any other domain name system, including for example blockchain domains, such as blockchain top level domains and blockchain second level domains. Such embodiments may also apply to any alternative root system.

We claim:

1. A system for returning information relating to a Global Trade Item Number (GTIN), comprising:
    a server computer including at least one processor and a memory, the memory storing a generic Top-Level Domain (gTLD) registry database adapted to contain one or more second-level domains, each of the one or more second-level domains including the GTIN, and
    wherein the at least one processor is configured to enforce at least one rule which restricts registrants in the of a respective gTLD to a limited number of entities, the respective gTLD being a single registrant gTLD;
    wherein the at least one processor is further configured to control operations of the single registrant gTLD under license from the Internet Corporation for Assigned Names and Numbers (ICANN);
    wherein the system is configured to operate within a Domain Name System (DNS) network environment and to resolve the GTIN on the Internet by returning the information as a Uniform Resource Locator (URL) in a form based on the GTIN and the single registrant gTLD; and
    wherein the single registrant gTLD is .gtin.

2. A system for returning information relating to a Global Trade Item Number (GTIN), comprising:
    a server computer including at least one processor and a memory, the memory storing a generic Top-Level Domain (gTLD) registry database adapted to contain one or more second-level domains, each of the one or more second-level domains including the GTIN, and
    wherein the at least one processor is configured to enforce at least one rule which restricts registrants in the of a respective gTLD to a limited number of entities, the respective gTLD being a single registrant gTLD;
    wherein the at least one processor is further configured to control operations of the single registrant gTLD under license from the Internet Corporation for Assigned Names and Numbers (ICANN);
    wherein the system is configured to operate within a Domain Name System (DNS) network environment and to resolve the GTIN on the Internet by returning the information as a Uniform Resource Locator (URL) in a form based on the GTIN and the single registrant gTLD; and
    wherein the single registrant gTLD is .ndc.

* * * * *